United States Patent

[11] 3,599,934

[72] Inventor Wayne D. Reed
 Philadelphia, Pa.
[21] Appl. No. 6,598
[22] Filed Jan. 28, 1970
[45] Patented Aug. 17, 1971
[73] Assignee Honeywell, Inc.
 Minneapolis, Minn.

[54] MULTIPURPOSE FORCE RING
 10 Claims, 12 Drawing Figs.
[52] U.S. Cl. .................................................. 251/363,
 277/58
[51] Int. Cl. ............................................... F16k 25/00
[50] Field of Search .......................................... 277/58-
 —65; 251/363, 174; 137/468

[56] References Cited
 UNITED STATES PATENTS
1,988,966 1/1935 Eckhouse ..................... 277/64

3,193,250 7/1965 Good et al. ................... 251/363
3,364,523 1/1968 Schippers ..................... 277/64

Primary Examiner—Robert L. Smith
Attorneys—Arthur H. Swanson, Lockwood D. Burton and John Shaw Stevenson ABSTRACT: A truncated cone-shaped ring member for inserting between two encased relatively movable parts, such as a bonnet and a cage located within a valve body, so that the adjustment of these parts towards one another will cause the ring to be moved toward an inverted truncated cone-shaped configuration and thereby provide a means that will take up not only the differences in manufacturing tolerances of these parts and their undesired changes in size that occur due to ambient temperature of the atmosphere surrounding these parts but also provide a means to maintain a seal that is in contact with at least one of these parts in fixed fluid tight engagement with the encasement surrounding these parts before, during and after the occurrence of the aforementioned ambient temperature changes.

PATENTED AUG 17 1971
3,599,934
SHEET 1 OF 2
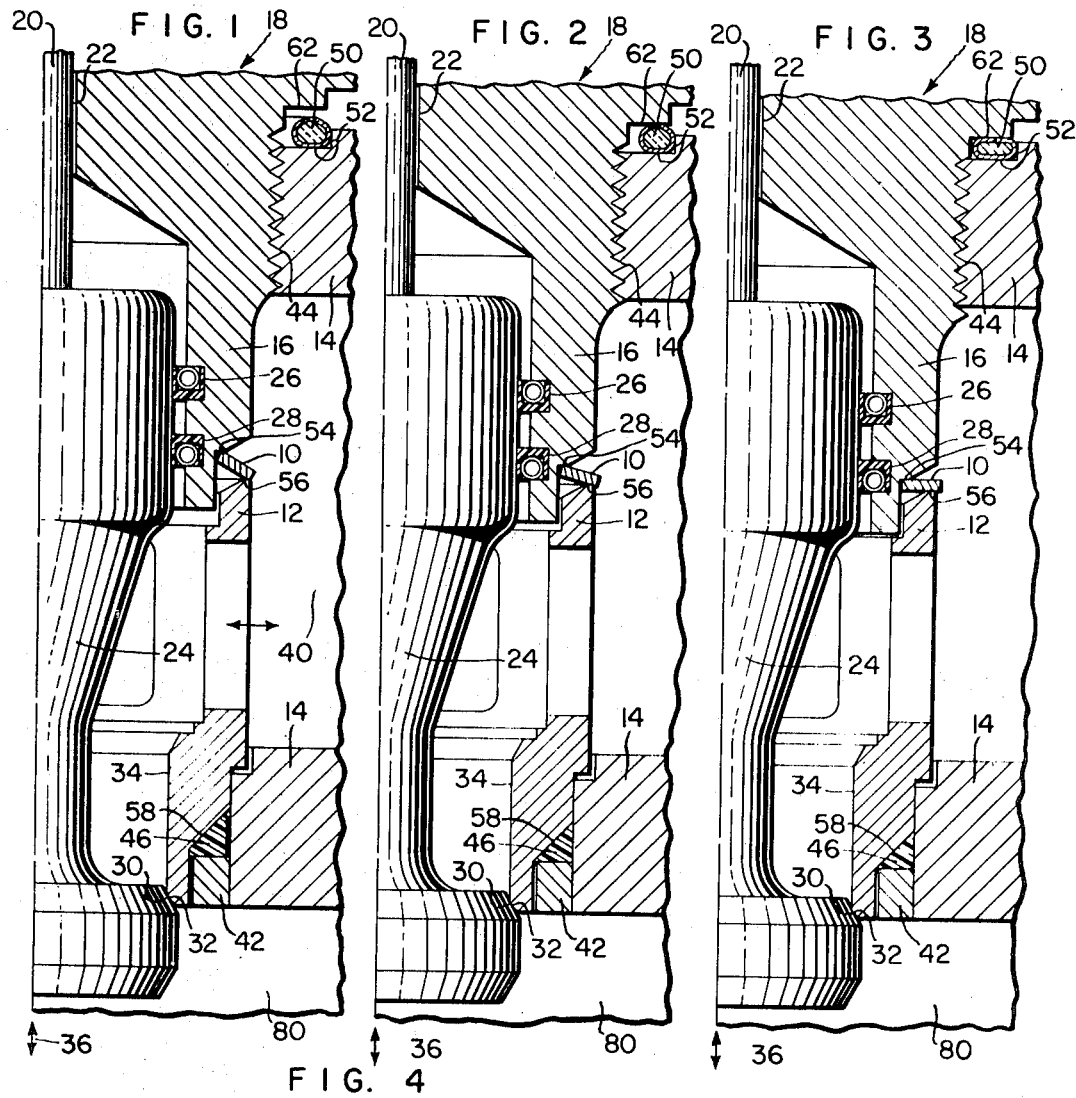
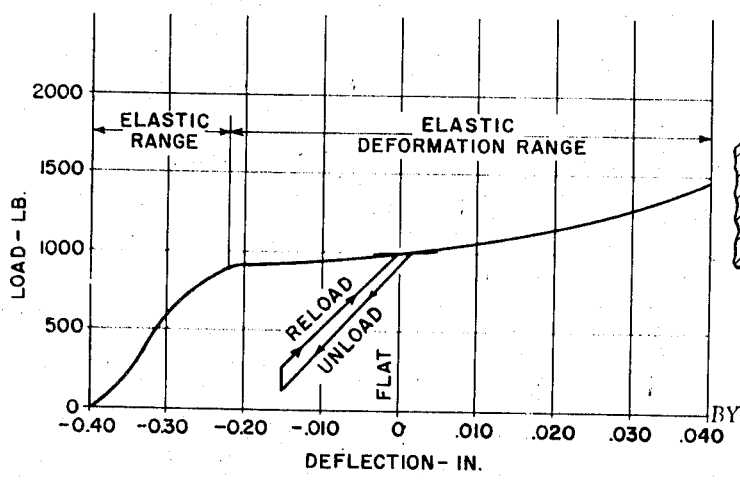
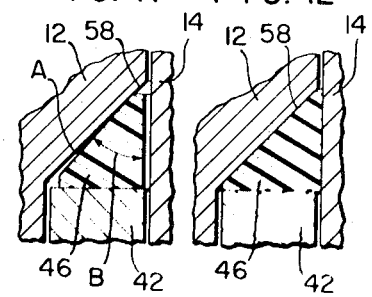
INVENTOR.
WAYNE D. REED
BY John Shaw Stevenson
AGENT.

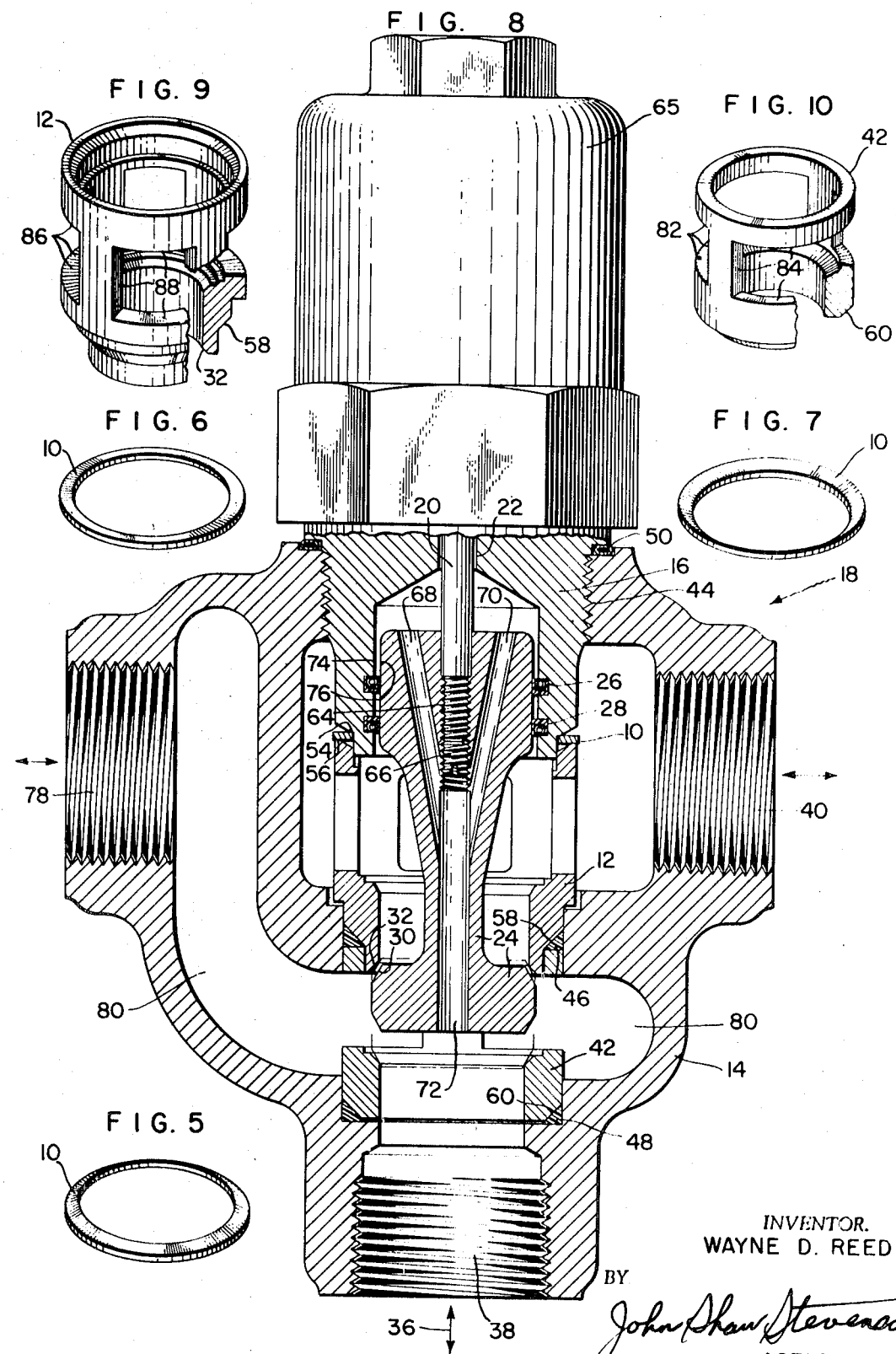

MULTIPURPOSE FORCE RING

One of the problems that has heretofore been encountered when parts are assembled with respect to one another in a housing is that they invariably will be under or above the prescribed tolerances and these differences make it difficult to assemble the parts within the prescribed limited spaces in the housing.

Another problem that adds to the difficulty in assembling these parts in a prescribed uniform manner is that the depth to which the aforementioned housing is bored out is invariably under or above the prescribed tolerance.

It is therefore an object of the present invention to provide a flexible ring between an two of the aforementioned nonuniform parts that are to be assembled whose purposefully built-in plastic deformation characteristics provide the necessary means for obviating the aforementioned tolerance difficulty.

It is an object of the present invention to disclose a uniquely constructed ring positioned between two relatively movable members which can be plastically deformed during a final stage in which its shape is changed from an initial truncated cone shape configuration toward an inverted truncated cone-shaped configuration to thereby obviate the aforementioned tolerance difficulties which these movable members experience when they are assembled.

More specifically it is another object of the present invention to provide a unique ring of the aforementioned type that can be employed between the ends of a cage and bonnet that face one another which are located for example inside the body of a valve such as a three-way valve.

It is another object of the present invention to provide a unique ring in a three-way valve in order to maintain a gasket that is between an internal valve body portion and a seated end of its associated cage in fluid-type undistorted contact with these parts before, during and after a change in temperature of a fluid passing through the valve has occurred and the resulting size of the valve parts are thereby changed due to their resulting expansion and contraction.

It is another object of the present invention to provide a unique ring of the aforementioned type that will prevent the cages from being misaligned with one another during assembly period.

It is still another object of the present invention to provide a unique ring of the aforementioned type between a bonnet and a cage which will reduce the torque that has heretofore been required to position the bonnet in its correct position with respect to the aforementioned cage means and gaskets and which will therefore provide an easier way of assembling these values.

It is another object of the present invention to provide the aforementioned unique ring in a three-way cage valve in order to maintain the separate gaskets that are between its internal valve body and an associated end of its cage and between the other end of this cage and a second cage adjacent thereto in fluidtight undistorted contact before, during, and after a change in temperature of a fluid passing through the valve has occurred and the resulting size of the valve parts are thereby changed due to their resulting expansion and contraction.

It is another object of the present invention to position a ring in a valve in the aforementioned manner so it can perform the additional function of applying pressure to a third gasket located between a bonnet and an outer surface of the body of the valve before, during and after the aforementioned changes in temperature of the fluid passing to the valve occurred and the resulting expansion and contraction of the bonnet and the valve body simultaneously occurs.

A better understanding of the present invention may be had from the following detailed description when read in conjunction with the accompanying drawings in which:

FIG. 1 is typical partial cross-sectional view of a cage valve showing the truncated shaped condition of the multipurpose force ring during the completion of the initial partially assembled stage and after the bonnet of the valve has been manually adjusted to an initial hand-tightened position and also while the aforementioned seals associated with this valve remain in a nonloaded unsealed condition;

FIG. 2 is a typical partial cross-sectional view of a cage valve showing the force ring in a second partially assembled position in which it has been partially moved by further tightening of the bonnet toward its invented truncated cone position while passing through its elastic range so that the inherent spring characteristic of the ring at this stage of assembly will retain the required load on a lower one of the seals to retain it in a sealed condition between the cage and the body of the valve regardless of the manufacturing tolerances of the bored out part of the body and differences in trim parts of the valve;

FIG. 3 is a typical cross-sectional view of a cage valve showing the force ring in a third assembled position in which the ring has been moved by further tightening of the bonnet away from its elastic range of operation into a range where it is in its plastically deformed range wherein tightening of the bonnet can occur without the ring introducing any further rupturing load on the lower seal or on the upper seal which latter seal has been moved by the bonnet into contact with the top surface of the body;

FIG. 4 shows the elastic range over which the ring allows a load versus deflection to occur between the bonnet and the cage during the initial step in assembling the cage valve at the left end of the chart and further shows the range over which the ring will transmit a desired plastic deformation without any substantial increase in load between the bonnet and the cage during the final steps in assembling this cage valve;

FIG. 5 is a view of the truncated cone-shaped ring before it is assembled in the valve;

FIG. 6 is a view of the aforementioned ring when it is moved to the assembled position shown in FIG. 2;

FIG. 7 is a view showing the maximum inverted truncated cone-shaped position to which the ring may be moved after it has reached its plastic deformation range condition as shown in FIG. 3;

FIG. 8 shows the ring in an assembled condition in a three-way valve that has two cages that are each seated on triangular sealing rings;

FIG. 9 shows the first one of two cages employed in the three-way valve shown in FIG. 8;

FIG. 9 shows the first one of two cages employed in the three-way valve shown in FIG. 8;

FIG. 10 shows the other one of the two cages that are employed in the three-way valve of FIG. 8;

FIG. 11 shows the loose unsealed condition of the single triangular ring seal during the initial assembly of the cage valve as shown in FIG. 1 in enlarged form; and FIG. 12 shows how the triangular seal is retained in the desired nondeformable position when the multipurpose ring has been moved to its finally assembled position such as is shown in FIGS. 3 and 8.

Referring now to the drawings in detail there is shown in FIG. 1 a typical application wherein the aforementioned unique multipurpose truncated conical ring member 10 can be advantageously employed between a first part, such as a cage 12 that is mounted in a stationary member 14 and a means in the form of a bonnet 16 mounted for movement in the stationary member which forms a body 14 of a cage valve 18.

The ring 10 is preferably constructed of a 18—8 stainless steel material or any other material that would give the characteristics that are shown in FIG. 4. In order to obtain the characteristics shown in FIG. 4 it is been found to be advantageous to initially prepare the ring for use by compressing it from its initial truncated cone shape position shown in FIG. 5 into its inverted truncated cone shape position shown in FIG. 7 and to then reverse the position of the ring in the press so it can be pressed in the opposite direction.

The valve 18 is shown in FIG. 1 as having a stem 20 slidably mounted for reciprocal movement with respect to the surface 22 of the bonnet 16. The valve plug 24 is fixedly connected for joint reciprocal movement with the stem at its lower end. The plug 24 in turn is slidably mounted in ring bearings 26, 28, that are mounted as shown in the bonnet 16. The plug 24 is provided with a tapered seating surface 39 for engagement with the lower inner cylindrical edge 32 of the cage 12 so that the passageway formed by the inner wall of the cage 34 can be cut off and a flow of fluid in the direction of the arrows 36 prevented from passing between a first passageway 38 and a second passageway 40.

Although the ring 10 as shown in FIGS. 1 and 8 as being employed in a three-way cage valve having two cages 12 and 42 as shown in detail in FIGS. 9 and 10 it should be understood that this ring can be beneficially employed between a bonnet and a single cage in a two-way cage valve that is required to retain a fixed pressure on a single seal during ambient temperature expansion of these parts. It can be used advantageously in other similar structures where for example either expansion due to ambient temperature of two mating parts would otherwise cause abutment and deformation to occur between these parts or wherein, one, or both of these parts must apply a substantially constant pressure to a single seal to retain it in a fluidtight position without distorting the seal upon an increase in ambient temperature of these parts.

The aforementioned ring 10 can also be beneficially employed to compensate for a condition wherein undesired manufacturing tolerances exist between one or both of these parts or in a bored out housing into which these parts are assembled.

It can be seen that the truncated cone-shaped ring shown in FIG. 5 is inserted into the housing 14 and the lower flat surface of the bonnet 16 is manually rotated and moved in a downward direction by means of its threaded connection 44 with the body 14 to a hand-tightened position as shown in FIG. 1.

Under the FIG. 1 initial assembly stage the triangular-shaped ring seal 46 shown in FIGS. 1 and 8 and another identical triangular seal 48 shown in FIG. 8 will be retained by the elastic spring 10 in its loose nonsealing condition between the respective associated cages 12, 42 and their respective cage 42 and stationary body part 14 of the cage valve 18. Under this FIG. 1 initial stage of assembly the commercially available seal 50 which is preferably of metal-clad asbestos-filled ring is in a nonsealed condition between the bonnet 16 and the surface 52 forming a recess wall portion on the top surface of the body 14.

As a wrench, not shown, is employed to increase the load applied by the horizontal surface 54 of bonnet 16 to the inner smallest diametral portion of the ring 10 as shown in FIG. 2 the outer larger diametral portion of the ring 10 will transfer an increasing amount of force in a downward direction to the upper horizontal portion 56 of the cage 12 by the amount shown by way of an example in the charted elastic range as shown in FIG. 4 for this ring 10.

Under this FIG. 2 or second stage of assembly the previously mentioned triangular seals 46, 48 shown in FIG. 8 will have been moved outward by the downward force of the lower chamfered peripheral ends 58, 60 of the cages 12, 42 into sealed tight engagement between their respective associated cages 12, 42 and their respective associated cage 42 and stationary body parts 14 of the cage valve 18.

Under FIG. 2 or the second stage of assembly the surface 62 of the bonnet 16 will have been moved downward to a position in which it is almost in contact with the seal 50. During the time in which the bonnet 16 is moved downward from its second or FIG. 2 position toward the FIG. 3 position the shape of the multipurpose ring 10 will be moved in a direction from its initial truncated cone shape towards a position in which it is of an inverted truncated cone shape. During the movement of the bonnet from the FIG. 2 to FIG. 3 position the inherent elastic characteristics of the multipurpose ring 10 will shift from one which transfers increasing loads applied to it by the bonnet into proportional increases in the force on the cages 12, 42 and seals 46, 48 to one which possesses plastic deformation characteristics in which further downward loading movement of the bonnet and the resulting deflection of the ring 10 can take place without the ring transferring a substantial increase in load to the cages 12, 42 and seals 46, 48 that it did when it was being operated in its FIG. 1 and FIG. 2 positions and in the elastic ring shown in FIG. 4.

It can also be seen that when he bonnet has been moved downward to its FIG. 3 position the seal 50 will be compressed into a desired good sealing relationship between the bonnet surface 62 and the recess surface 52 in the body of the valve 18. This last-mentioned sealing action prevents the trim parts which have any number of differences in manufacturing tolerances to be assembled in a uniform manner in the valve and with uniform sealing pressure acting on the seals.

It should be noted that without having a unique multipurpose ring 10 which initially has an inherent elastic range characteristic and a latter deformable plastic range characteristic it would be impossible for the seals 46, 48 to otherwise be assembled without being distorted by downward movement of the bonnet 16.

It can be seen by observing FIG. 4 that after the load of tHe bonnet has been increased and the ring has been moved from its truncated cone-shaped position to its flat or horizontal position that the load of the bonnet acting on the ring 10 can be rapidly unloaded and reloaded.

The stationary zero load −0.40-inch deflection point on the chart shown in FIG. 4 indicates the condition that the ring 10 will be in during the FIG. 1 condition or a condition immediately after the bonnet has been threadedly rotated into a hand tight position against the ring 10.

The last plotted point on the right end of the chart indicates the load deflection characteristics of the ring when it has been moved from its initial truncated cone-shaped position into its fully deflected inverted cone-shaped position.

It should be noted that each of the triangular-shaped ring seals 46, 48 are constructed and placed into their final assembled positions as is shown for the seal 46 in FIGS. 11 and 12. The angle A shown in FIG. 11 is 45° and the angle B of each of the seals 46, 48 is made of a smaller angle namely 44°.

It can be seen that when the chamfered end portions 58, 60 of the cages 12 and 42 shown in FIGS. 8, 11, and 12 are moved from their nonloaded unsealed positions as shown in FIG. 11 to their previously described loaded seal position as shown in FIG. 12 the seal 46 will be moved outward against the body 14 and into fluid tight sealed contact with the lower end portion 58 of the cage 12 and the upper end of the lower cage 42.

The seal 48 will likewise be moved in a similar fluidtight sealing manner outward and downward against the body 14 and outward into contact with the lower end portion 60 of the lowermost cage 42.

The stem 20 of the plug 24 shown in FIG. 8 is shown sidedly connected at 64 to the plug and has a retaining shoe 66 positioned in the plug to retain the plug 24 and stem 20 in a fixed relation with one another as a fluid, not shown, is applied to the spring return piston type actuator 65 that in turn is connected for movement with the other end of the stem 20.

The plug also has a pair of angularly positioned passageways 68 and 70 connected to and opening into a vertical passageway 72 to allow the same pressure of the fluid to be applied to the areas 74, 76; 30, 32 formed by the bonnet 16 and cage 42 along which the plug 24 is brought into engagement.

When the plug is in its lowermost dotted line position a fluid can flow from a flow line, not shown, but which is located at the left side passageway 78 of the three-way valve shown in FIG. 8 through the passageway 80 in the body 14 through the aperture-forming walls 82, 84, formed in a cage 42 through aperture-forming walls 86, 88, formed in a cage 12 and out of the passageway 40. It can be seen that the fluid can also be directed in a reverse direction from that just described wherein it passes from passageway 40 to passageway 78.

When the lower end of the plug is in its uppermost outlined position the fluid can flow from a flow line, not shown, through the left side passageway 78 of the three-way valve, shown in FIG. 8, through the passageway 80 in the body through aperture-forming walls 82, 84 of the cage 42 and out the passageway 36.

It can be seen that the fluid can also be directed in a reverse direction from that just described wherein it passes from passageway 36 to passageway 78.

In any of the aforementioned condition of the unitary plug it will always be maintained in a fully balanced position due to the previously described equal top and bottom trim areas along which the same fluid pressure is allowed to be applied thereto.

Experimentation has shown that under any of the aforementioned conditions of the unitary plug and/or under any condition in which the ambient temperature of the parts due to the hot temperature of the fluid passing through the valve extends through abnormally high and low temperatures, the valve will perform its functions without any distortion or leakage taking place at any of the seals 46, 48, 50 because of the unique arrangement of the multipurpose ring 10.

The embodiments of the invention in which an exclusive property or privilege is claimed are defined as follows:

1. An apparatus to maintain a seal in a substantially uniform fluid tight nondistorted engagement with a stationary member before, during and after a change in an ambient temperature condition, comprising a first part slidably positioned in the stationary member and having one end in contact with the seal, a truncated conical ring member having one of its peripheral surfaces in contact with the other end of the first part, a means mounted for movement on the stationary member to apply a preselected force to an opposite peripheral surface of the ring member to move it toward a final position in which it is an inverted truncated conical shaped configuration and the resulting force on the first part is employed to retain the seal in said fluid tight nondistorted engagement with the stationary member.

2. The apparatus as defined in claim 1 wherein a second seal is employed that protrudes out of an external surface of the stationary member and wherein the second seal is compressed by the movable means into fluid tight substantially flush engagement with an outer surface of the stationary member immediately before the ring reaches its final position.

3. The apparatus as defined in claim 1 wherein there ring is constructed to produce an increase elastic spring force with an increase in the adjustment of the movable means during the initial adjustment of the movable means and to produce a plastic defermation with substantially constant force during the latter stage thru which the movable means is actuated.

4. The apparatus as defined in claim 1 wherein the first part is a cage and the stationary member is a body of a cage valve.

5. The apparatus as defined in claim 1 wherein the first part is a cage and the stationary member is a body of a cage valve and wherein the movable means is a bonnet of said valve.

6. The apparatus as defined in claim 1 wherein the first part is of a sleeve shape configuration and wherein physical contact between the ring and the first part takes place along a peripheral surface that forms the largest peripheral portion of the truncated conical ring member.

7. The apparatus as defined in claim 1 wherein a portion of a wall forming a hollow cylindrical part of the movable means is employed to apply its force to the smallest diametral portion of the truncated conical ring member.

8. The apparatus ad defined in claim 1 wherein the first part is of a sleeve shape configuration and wherein physical contact between the ring and the first part takes place along a peripheral surface that forms the largest peripheral portion of the truncated conical ring member and wherein a portion of a wall forming a hollow cylindrical part of the movable means is employed to apply its force to the smallest diametral portion of the truncated conical ring member.

9. The apparatus as defined in claim 1 wherein the first part is of a sleeve shape configuration and wherein physical contact between the ring and the first part takes place along a peripheral surface that forms the largest peripheral portion of the truncated conical ring member, and wherein the surface adjacent the last-mentioned contacting surface of the sleeve part is of a bevel shape configuration to provide a space through which the displacement of the noncontacting portion of the ring can move during the time it is moved by the movable means between its truncated conical shape position toward an inverted conical truncated position.

10. The apparatus as defined in claim 1 wherein a portion of a wall forming a hollow cylindrical part of the movable means is employed to apply its force to the smallest diametral portion of the truncated conical ring member and wherein another noncontacting portion of the wall forming the hollow cylindrical portion of the movable means is of a bevel-shaped configuration to provide a space through which the displacement of the noncontacting portion of the ring can move during the time it is moved by the movable means between its truncated conical shaped position towards an inverted conical truncated position.